United States Patent [19]

Heinle

[11] Patent Number: 4,481,601

[45] Date of Patent: Nov. 6, 1984

[54] METHOD AND CIRCUITRY FOR APPROXIMATING THE MAGNITUDE OF A VECTOR

[75] Inventor: Georg Heinle, Erlangen, Fed. Rep. of Germany

[73] Assignee: Siemens AG, Munich and Berlin, Fed. Rep. of Germany

[21] Appl. No.: 379,157

[22] Filed: May 17, 1982

[30] Foreign Application Priority Data

May 21, 1981 [DE] Fed. Rep. of Germany ....... 3120319

[51] Int. Cl.[3] .......................... G06G 7/22; G06F 7/38

[52] U.S. Cl. ..................................... 364/815; 364/730

[58] Field of Search ............... 364/730, 815, 816, 817, 364/729, 850

[56] References Cited

U.S. PATENT DOCUMENTS

| | | | |
|---|---|---|---|
| 3,473,011 | 10/1969 | Schmid | 364/815 |
| 3,710,087 | 1/1973 | Siegel | 364/815 |
| 3,927,312 | 12/1975 | Dickinson | 364/730 |
| 3,974,367 | 8/1976 | Mayer | 364/815 X |

*Primary Examiner*—Charles E. Atkinson
*Assistant Examiner*—A. MacDonald
*Attorney, Agent, or Firm*—Karl F. Milde, Jr.

[57] ABSTRACT

A magnitude signal representing the approximate magnitude of a control parameter vector for the control of multi-phase electrical apparatus is developed from the Cartesian coordinate signals of the vector. Signals representing one or both coordinates of a plurality of auxiliary vectors are formed by vector rotation coordinate determination techniques. The signal from among the auxiliary vector coordinate signals (and, optionally the control parameter vector coordinate signals) having the greatest absolute value is selected as the magnitude signal. Auxiliary vector coordinate signals are formed by proportional stages coupled to adder stages which combine specified constant proportions of the control parameter vector coordinate signals. A diode network provides biasing so that only the signal with the greatest value will be passed. The auxiliary vector forming method for vector magnitude approximation provides accuracy and simplicity.

25 Claims, 6 Drawing Figures

METHOD AND CIRCUITRY FOR APPROXIMATELY THE MAGNITUDE OF A VECTOR

BACKGROUND OF THE INVENTION

1. Field of the Invention

The invention relates to a method and circuitry for developing a magnitude signal which represents the approximate magnitude of a control parameter vector for the control of a multi-phase electrical apparatus, such as a rotary field machine or a three-phase system.

2. Description of the Prior Art

In the control of rotary field machines and of three-phase power supplies, the problem often arises of determining the magnitude of a vector (e.g. a voltage or current vector) which is defined by its coordinates. In the control of a rotary field machine, for example, a magnetizing current control produces the desired value for the magnetizing current, and an active current control the desired value for the active current, the two currents being phase-shifted by 90°, i.e., the respective vectors are perpendicular to one another. The rotary current machine is controlled with a current composed of the magnetizing current thus determined and of the active current, it being necessary to determine the magnitude of the current.

The seemingly most obvious method to use to determine the magnitude of a vector is the Pythagorean theorem. This method is, however, relatively complicated to implement with circuitry since it requires the use of two squaring components and a root evolving component. Moreover, analog squarers and root evolvers cause very high errors at small values.

Existing literature describes a circuit referred to as a "vector meter" for the formation of the magnitude of a vector. This circuit operates with a control loop which proceeds from a transformed formulation of the Pythagorean theorem. It requires two adders and a multiplier with division input. Analog dividers, however, are relatively complicated, and have limited accuracy at small values.

Another known possibility is the formation of the magnitude of a vector by approximation using the so-called "characteristic curve" method, which is employed in commercially available equipment. The characteristic used for this method is shown in FIG. 1. The x-coordinate $V_X$ of a vector V is plotted on the abscissa, and its magnitude | is plotted on the ordinate. The characteristic consists of a group of lines parallel to the ordinate with the y-coordinate of the vector V as parameter, and of the bisectors of the coordinate system. As long as the coordinates of the vector V lie in the zone of the group of straight lines, the y-component of the vector V is used in accordance with these lines as the magnitude | of the vector. For vector coordinates outside the group of lines, the magnitude | of the vector is determined from the x-coordinate by way of the respective bisector, that is, the x-coordinate is used as the magnitude. Since the group of lines of the characteristic comes into play when the y-coordinate of the vector V is greater than its x-coordinate, what the characteristic curve method amounts to in the last analysis is that the greater of the two coordinates of the vector V is chosen as the magnitude of the vector. The accuracy of this method, however, is very low. The maximum occurring error is about 30% and occurs when the two coordinates of the vector V are identical.

SUMMARY OF THE INVENTION

It is an object of the invention to provide an improved method for determining the magnitude of a vector for the control of multi-phase electrical apparatus, whose accuracy can be selected and which can be implemented without the need for divider elements.

It is a further object of the invention to provide circuitry for implementing the method of the invention.

According to one aspect of the invention, an approximate value for the magnitude of a vector V is achieved by forming at least one auxiliary vector $V_i$ which has the same length as the vector V but which is rotated by an angle $\alpha_i$ relative thereto; and selecting as the value for the magnitude of the vector V the maximum value of the coordinates of the vector V and the auxiliary vector or vectors $V_i$. In this method of magnitude determination, the absolute value formation is effected by a vector rotation which is easily realizable and by a maximum value selection. The method becomes more accurate, the more auxiliary vectors that are formed. The accuracy is thus controllable at will be selecting the appropriate number of auxiliary vectors.

Advantageously, the approximate value for the magnitude of the vector V is taken as the maximum value of corresponding ones of the coordinates of the vector V and the auxiliary vectors $V_i$. In this case, it suffices to evaluate only one coordinate. Any reduction of accuracy due to ignoring the other coordinate can be compensated for by increasing the number of auxiliary vectors formed.

For n auxiliary vectors $V_i$ formed for a vector V which is given in a Cartesian coordinate system, they are appropriately rotated relative to the vector by the angle $\alpha_i=90°/(2n+1)\cdot 2i$. For an established number of auxiliary vectors, rotation by this angle results in the optimum accuracy.

If for a vector V given in a Cartesian coordinate system n auxiliary vectors $V_i$ are formed, these may be rotated relative to the vector also by the angle $$\alpha_i = \frac{90°}{2n} + (i-1)\cdot\frac{90°}{n}$$

and the approximate value for the magnitude of the vector V may be taken as the maximum value of corresponding ones of the coordinates of the auxiliary vectors $V_i$. In this case, the optimum angle of rotation is different, since the coordinates of the vector itself are not included in the maximum value selection.

Vectors lying in any quadrant of the coordinate system can be readily transformed into the first quadrant by absolute value formation of the two coordinates.

Coordinates of vectors not present in the Cartesian coordinate system are expediently transformed before the absolute value formation into Cartesian coordinates by coordinate transformation. This is because the operations required for the method of the invention can best be carried out in the Cartesian coordinate system.

In another aspect of the invention, a circuit arrangement for the practice of the method is provided wherein a magnitude signal representing the approximate magnitude of a vector V is developed from coordinate signals that represent the Cartesian coordinates of the vector V. A coordinate signal is formed for each of a plurality of auxiliary vectors $V_i$, by applying proportionate parts of each of the vector V coordinate signals by means of a proportional stage as inputs to an adder stage. The outputs of the adder stages, and optionally also one or both vector V coordinate signals, are then applied to a maximum value selection circuit which selects the largest of the auxiliary vector $V_i$ coordinate signals (and one or both of the vector V coordinate signals if desired) as the usable vector V magnitude signal. The method of the invention is thus readily implemented by circuitry comprising simple proportional stages, adder stages and a maximum value selection circuit.

An especially simple maximum value selection circuit comprises a plurality of diodes, respectively connected at their one terminals to receive the auxiliary vector coordinate output signals from the adders (and, optionally, to receive one or both of the vector V coordinate signals) and connected at their other ends to a common maximum value selection circuit output terminal.

The accuracy of the maximum value selection circuit can be increased by providing as the proportional and adder stages for each auxiliary vector, an operational amplifier having a first input connected to receive the reference potential of the circuit arrangement and a second input connected to receive the x- and y-coordinates of the vector V through respective first and second resistors. A first diode is connected between the second amplifier input and the amplifier output, and a second diode is connected between the amplifier output and the maximum value selection circuit output terminal that is common for the separate circuits of each auxiliary vector and at which the desired approximate value is developed. This latter circuit provides maximum value selection without the diode thresholds found to be disturbing in single diode circuits.

There have thus been outlined rather broadly certain objects, features and advantages of the invention in order that the detailed description that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other arrangements for carrying out the purposes of this invention. It is important, therefore, that this disclosure be regarded as including all such equivalent arrangements that encompass the spirit and scope of the invention.

BRIEF DESCRIPTION OF THE DRAWINGS

Embodiments of the invention have been chosen for purposes of illustration and description, and are shown in the accompanying drawings forming a part of the specification, wherein.

DETAILED DESCRIPTION OF THE PREFERRED EMBODIMENTS

Figure 1:
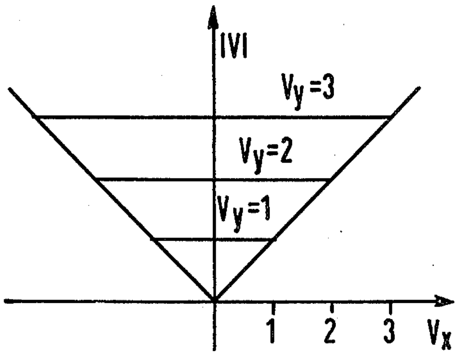
FIG 1 (PRIOR ART)
FIG. 1 (prior art) illustrates an example of the prior art characteristic curve method of vector magnitude approximation.
Figure 2:
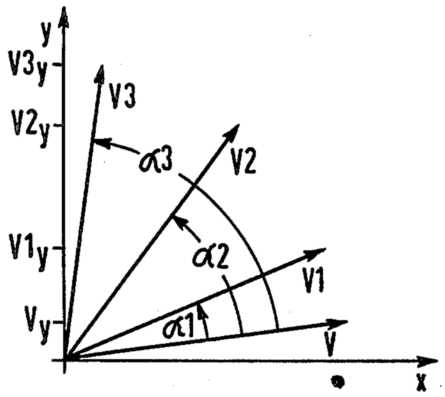
FIG. 2 illustrates an example of the auxiliary vector formation method of vector magnitude approximation in accordance with the invention.

The principles of the method according to the invention are illustrated with respect to the example given in FIG. 2. In FIG. 2, a vector whose magnitude | is to be determined is shown represented in the first quadrant of a Cartesian coordinate system by x- and y-coordinates.

It is assumed that the vector V is already present in the first quadrant of the Cartesian coordinate system. Vectors which do not lie in the first quadrant can be projected into the first quadrant by absolute value transformation of their Cartesian coordinates. Vectors defined in oblique or other coordinate systems, e.g. in the 120° coordinates of a multi-phase current system, can be transformed into the Cartesian coordinate system by means of well-known coordinate transformation techniques.

In the example of FIG. 2, three auxiliary vectors $V_1$, $V_2$ and $V_3$ are formed from the vector V. The auxiliary vectors $V_1$–$V_3$ have lengths that coincide with the length of the vector V and are rotated relative to the vector V by the respective acute angles $\alpha_1$ $\alpha_2$ and $\alpha_3$.

An approximation of the value of the magnitude | of the vector V can then be obtained by forming either the maximum value of the x- and y-coordinates of the vector V and of the auxiliary vectors $V_1$–$V_3$, or the maximum value of only one coordinate of the vector V and of the auxiliary vectors $V_1$–$V_3$. Alternatively, a maximum value selection can be performed which entirely omits any consideration of the coordinates of the vector V.

In the example of FIG. 2, only the y-coordinates are made use of for the absolute value formation. Using only one coordinate has the advantage that the second coordinate of the auxiliary vectors $V_1$–$V_3$ need not be determined. And using the y-coordinate has the advantage that, in contrast to the x-coordinate, the y-coordinate of the auxiliary vectors $V_i$ cannot be negative for any vector V lying in the first quadrant and angles $\alpha_1$–$\alpha_3$ which are smaller than 90°. The desired approximate value for the magnitude of the vector thus equals the maximum of the y-coordinate of the auxiliary vectors $V_1$–$V_3$ and, optionally, of the vector V. Hence in the example, the desired approximate value equals $V_{3y}$—the y coordinate of the auxiliary vector $V_3$.

The accuracy of this method depends on the correct selection of the angles $\alpha_1$–$\alpha_3$ and on the number n of auxiliary vectors $V_1$–$V_3$ formed from the vector V. The following law of formation for the angles of rotation $\alpha_i$ furnishes the best results when one does not include the y-coordinate of the vector V in the maximum value selection:

$$\alpha_i = \frac{90^\circ}{2n} + (i-1)\cdot\frac{90^\circ}{n} \qquad (1)$$

For n=3, therefore, the angles of rotation of the auxiliary vectors $V_1$–$V_3$ relative to the vector V are: $\alpha_1=15°$; $\alpha_2=45°$; and $\alpha_3=75°$. As is clear from the example shown in FIG. 2, these are the optimum angles of rotation. In fact, the greatest error occurs when the angle between the y-axis and the nearest auxiliary vector $V_i$ is greatest. As an analysis of FIG. 2 indicates, this angle cannot become greater than 15° at the stated selection of the angles $\alpha_1$–$\alpha_3$. The maximum error occurs when the vector V lies on the x-axis.

Following this reasoning, the maximum error $F_{max}$ occurring in the example can be calculated as follows:

$$F_{max}=-(1-\cos 15°)\cdot 100\%=-3.4\% \quad (2)$$

For the general case of n auxillary vectors $$F_{max}=-[1-\cos (45°/n)] \quad (3)$$

From the above reasoning, it follows that the error is always negative, i.e. that the approximate value for the vector magnitude will never become greater than the actual vector magnitude. Therefore, by multiplying the obtained approximate value by a constant "a", so that the error is symmetrical around zero, one can reduce the maximum error to ±1.7%. This factor a is derived from the following reasoning:

The mean value of the approximate value | is:

$$|v|_m' = \frac{(1+\cos 15°)}{2}\cdot|v| \quad (4)$$

where | is the actual magnitude of the vector V. Now if the approximate value |' obtained by the described method is multiplied by a factor a such that its mean value equals the actual magnitude of the vector V, (i.e., so that the approximate value coincides with the actual magnitude | not at its maxima as before but at its mean value), then the above-mentioned symmetrical error can be obtained with this factor a. The factor a is obtained, therefore, according to the following equation:

$$a = \frac{2}{(1+\cos 15°)} \quad (5)$$

The above reasoning shows that even with the formation of as few as three auxiliary vectors $V_1$–$V_3$, an error as small as ±1.7% is obtainable. The method according to the invention offers the special advantage that this error does not increase at small magnitudes as is the case with methods using a dividing step.

Naturally, numerous variants of the described method are conceivable. For example, the x-coordinate of the vector V, the y-coordinate of the vector V, and also the x-coordinates of the auxiliary vectors $V_i$ can be included in the maximum value selection, whereby the law of formation for the optimum angles of rotation changes and the accuracy becomes greater.

If, for example, the magnitude of the vector V is formed from the y-coordinates of the auxiliary vectors $V_i$ and of the vector V, the optimum angles of rotation are defined by:

$$\alpha_i = \frac{90°}{(2n+1)}\cdot 2i$$

In this case, the greatest angle between the y-axis and the nearest auxiliary vector $V_i$ for three auxiliary vectors is 12.9°, as compared to an angle of 15° where the y-coordinate of the vector V is not considered. Hence, the accuracy of the method is increased.

Figure 3:
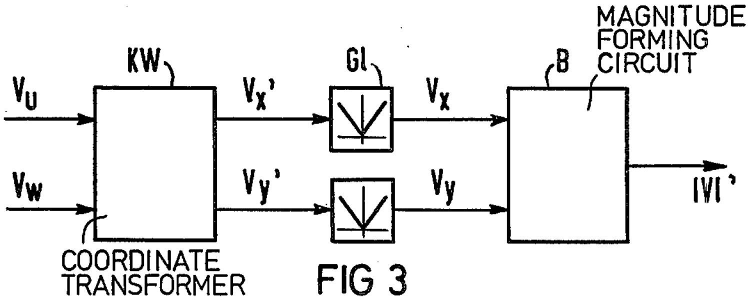
FIG. 3 is a block diagram of circuitry used to implement the method of FIG. 2.

Circuitry for the practice of the described method is shown in FIGS. 3–6. FIG. 3 is a block diagram of a usable circuit arrangement. The coordinate signals $V_u$ and $V_w$ represent the coordinates of vector V, present in any oblique coordinate system. These signals are transformed by means of a coordinate transformer KW (FIG. 3) into signals $V_x'$, $V_y'$, representing the equivalent coordinates of the vector in the Cartesian coordinate system. By means of the component G1, the vector V is then rotated into the first quadrant of the Cartesian coordinate system. This is done simply by taking the absolute value of the coordinate signals $V_x'$ and $V_y'$, such as by rectifying them. A vector V in the first quadrant of the Cartesian coordinate system is thus defined by the coordinate signals $V_x$, $V_y$. The approximate magnitude |' of the vector V is formed by the circuit B.

Figure 4:
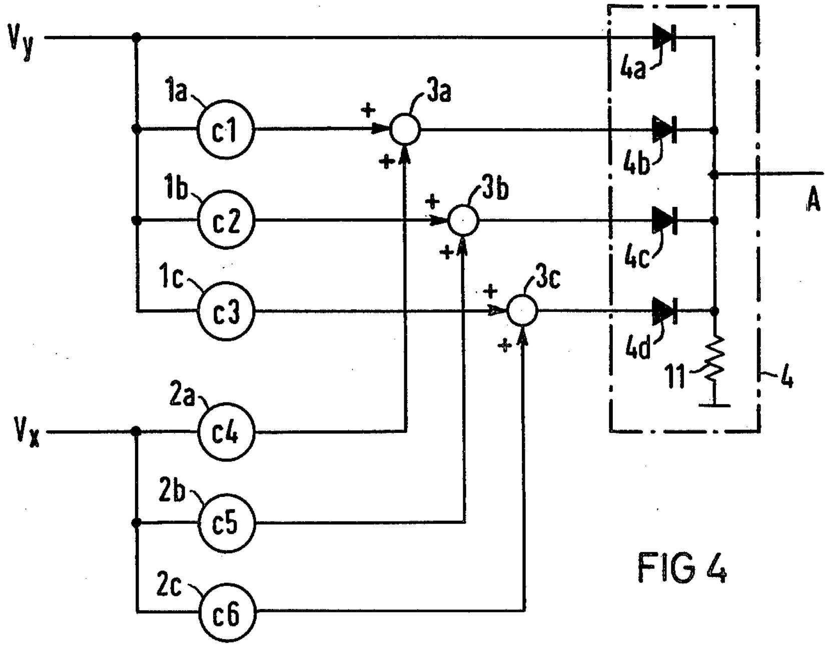
FIG. 4 is a schematic diagram of an embodiment of part of the circuitry of FIG. 3.

FIG. 4 shows the details of an embodiment of the circuit B used for developing a magnitude signal to represent the approximate magnitude of the vector V defined by the absolute value Cartesian coordinate signals $V_x$, $V_y$. In accordance with the described methods, auxiliary vector coordinate signals are formed which represent at least one of the coordinates of a plurality n of auxiliary vectors $V_i$ which have the same magnitude as the vector V but are rotated by different angles relative thereto.

The following vector equation for the rotation gives the y-coordinate of an auxiliary vector $V_i$ formed by rotating the vector V through an angle $\alpha_i$:

$$V_{iy}=V_x\cdot\sin\alpha_i+V_y\cdot\cos\alpha_i \quad (6)$$

As in the example of FIG. 2, the embodiment of FIG. 4 considers three auxiliary vectors $V_1$, $V_2$, and $V_3$ which correspond to rotation of the vector V through the angles $\alpha_1$, $\alpha_2$ and $\alpha_3$ respectively. The angles $\alpha_{1-\alpha 3}$ are advantageously defined, as described above, as $\alpha_1=15°$, $\alpha_2=45°$, $\alpha_3=75°$. Signals are formed corresponding to the y-coordinates only ($V_{1y}$, $V_{2y}$, and $V_{3y}$) of the auxiliary vectors $V_{1-V3}$. These are determined applying rotational coordinate transformation equations to the coordinates $V_x$, $V_y$ of the vector V, as follows:

$$V_{1y}=C_1\cdot V_y+C_4\cdot V_x \quad (6a)$$

$$V_{2y}=C_2\cdot V_y+C_5\cdot V_x \quad (6b)$$

$$V_{3y}=C_3\cdot V_y+C_6\cdot V_x \quad (6c)$$

where, the constants $C_1$–$C_3$ which are multiplied by the y-coordinate signal of vector V are defined by:

$$C_1=\cos\alpha_1=\cos 15°=0.966$$

$$C_2=\cos\alpha_2=\cos 45°=0.704$$

$$C_3=\cos\alpha_3=\cos 75°=0.258$$

and the constants $C_{4-C6}$ which are multiplied by the x-coordinate signal of the vector V are defined by:

$$C_4=\sin\alpha_1=\sin 15°=0.259$$

$$C_5=\sin\alpha_2=\sin 45°=0.704$$

$$C_6=\sin\alpha_3=\sin 75°=0.966$$

Since the y-coordinates of the vectors $V_{1-V3}$ are obtained by simple multiplication and addition, the contributions of the y-coordinate signals ($C_1V_y$, $C_2V_y$ and $C_3V_y$) and x-coordinate signals ($C_4V_x$, $C_5V_x$ and $C_6V_x$) of the vector V to the y-coordinate signals of the vectors $V_{1-V3}$ can be obtained respectively using simple proportional stages 1*a*, 1*b*, 1*c* and 2*a*, 2*b*, 2*c*, respectively (FIG. 4).

The $V_x$ and $V_y$ signal components of the auxiliary vector coordinate signals are then combined by adders 3*a*, 3*b* and 3*c*, connected as shown in FIG. 4, to provide the y-coordinate signals of the vectors $V_1$–$V_3$. The proportional stages and their associate adder stages can be implemented by means of operational (summing) amplifiers.

In accordance with equations (6a)–(6c), the outputs of the proportional stages 1a and 2a are connected as inputs to the adder stage 3a; the outputs of the porportional stages 1b and 2b are connected as inputs to the adder stage 3b; and the outputs of the proportional stages 1c and 2c are connected as inputs to the adder stage 3c. According to the described method, the circuitry of FIG. 4, provides means for selecting the maximum of the auxiliary vector y-coordinate output signals of the adder stages 3a–3c and also (optionally) the y-coordinate signal $V_y$ of the vector V.

This is done in the simplest case (see FIG. 4) by connecting the mentioned signals via diodes 4a–4d with a common point which is connected via a resistor 11 to the reference potential of the circuit arrangement and is connected with the output terminal A of the circuit arrangement. The diodes 4a–4c operate so that only approximate value |' for the magnitude of the vector V is available at the output terminal A.

Figure 5:
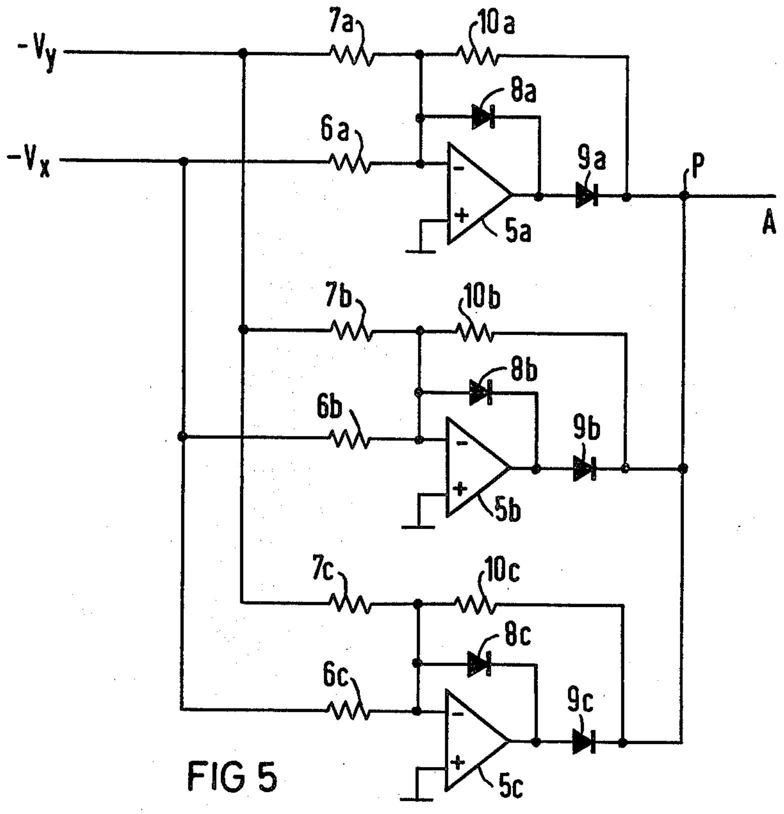
FIG. 5 is a schematic diagram of a modified form of the part of the circuitry of FIG. 3 shown in FIG. 4.

FIG. 5 shows the details of a modified form of the circuit of FIG. 4 which avoids the disadvantage of adverse effects caused by the thresholds of the diodes 4a–4d of FIG. 4 on the accuracy of the circuit arrangement.

In the embodiment of FIG. 5, the proportional stages 1a–1c and 2a–2c together with the adder stages 3a–3c and the maximum value selection circuit 4 are realized by means of operational amplifiers 5a–5c. Here the non-inverting input of each operational amplifier 5a–5c is connected to the reference potential of the circuit arrangement. The inverting inputs of the operational amplifiers 5a–5c are respectively connected by means of the resistors 6a–6c to receive the negative x-cooridinate signal $V_x$ of the vector V and by means of other resistors 7a–7c to receive the negative y-coordinate signal $V_y$ of the vector V. Diodes 8a–8c are respectively connected between the inverting inputs and the outputs of the operational amplifiers 5a–5c with their cathodes facing the outputs. The outputs of the operational amplifiers 5a–5c are also respectively connected through diodes 9a–9c to a common connecting point P, which is in turn connected with the output A of the circuit arrangement. The diodes 9a–9c are connected with their cathodes toward the point P. In addition, resistors 10a–10c are respectively connected between the inverting inputs of the operational amplifiers 5a–5c and the common connecting point P.

In the embodiment according to FIG. 5, in contrast to the embodiment according to FIG. 4, the y-coordinate of the vector V is not evaluated, since here a separate operational amplifier would be necessary for the maximum value selection.

Without the connection with the common connecting point P, the output of each operational amplifier 5a–5c would adjust itself to a voltage proportional to the sum of the coordinates $V_x$, $V_y$ as a function of the ratio of the resistances of the resistors 6a–6c, 7a–7c and 10a–10c. The values of the resistors 6a–6c, 7a–7c and 10a–10c must therefore be selected to give the proportionality factors $C_1$–$C_6$, defined above.

The diodes 9a–9c and 8a–8c have no influence on the magnitude of the output voltage, which depends only on the resistors. They merely provide that when the outputs of the operational amplifiers 5a–5c are connected with the common connecting point P, only the maximum of the output voltages, i.e. the greatest y-coordinate of the auxiliary vectors $V_1$–$V_3$, appears at the output A. Hence, there is present at the output A the desired approximate value for the magnitude of the vector V, which in this case is independent of the threshold voltages of the diodes.

Figure 6:
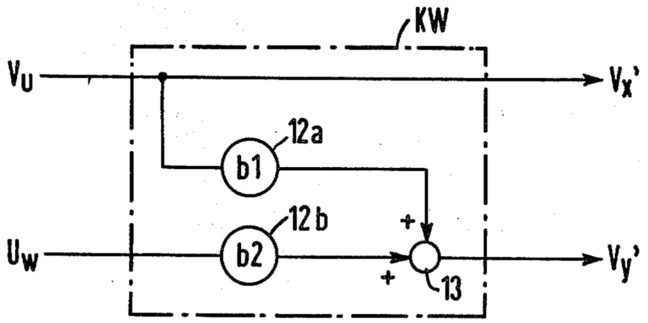
FIG. 6 is a schematic diagram of an embodiment of a different part of the circuitry of FIG. 3.

Finally, FIG. 6 shows an embodiment of the coordinate transformer KW. If, for example, it is desired to transform the coordinates $V_u$, $V_w$ given in a 120° coordinate system into rectangular Cartesian coordinates $V_x'$, $V_y'$, one can proceed according to the following equations:

$$V_x' = V \tag{7}$$

$$V_y' = \frac{2}{\sqrt{3}} \cdot (\tfrac{1}{2} V_u + V_w)$$

In the circuit according to FIG. 6, these equations are realized in that the coordinate $V_u$ is taken over unchanged as the x-coordinate $V_x'$. Moreover, one supplies the coordinate $V_u$ via a proportional stage 12a with the proportionality factor b1 and the coordinate $V_w$ via a proportionality stage 12b with the proportionality factor b2 to an addition stage 13, at the output of which the y-coordinate $V_y'$ is available. According to equation (7), the proportionality factor b1 is $1/\sqrt{3}$ and the proportionality factor b2 is $2/\sqrt{3}$. Naturally, the coordinate transformer KW and also the circuit Gl for rotation of the vector V into the first quadrant of the Cartesian coordinate system may be omitted if the vector V is already present in suitable form.

Having thus described the invention with particular reference to the preferred forms thereof, it will be obvious to those skilled in the art to which the invention pertains, after understanding the invention, that various changes and modifications may be made therein without departing from the spirit and scope of the invention as defined by the claims appended hereto. It will be appreciated that the selection, connection and layout of the various components of the described configurations may be varied to suit individual tastes and requirements.

What is claimed is:

1. In a method of determining an approximate value for the magnitude of a vector V given by its x- and y-coordinates in a coordinate system and which lies in a quadrant of the coordinate system, the improvement comprising the steps of:

(a) forming at least one auxiliary vector $V_i$ which has the length of the vector V; and (b) rotating said auxiliary vector $V_i$ relative to the vector V by an angle $\alpha_i$ which is smaller than the angle between the two coordinate axes, so the approximate value |' for the magnitude of the vector V equals the maximum value from the x-and y-coordinates of the vector V and of the auxiliary vector $V_i$.

2. The method according to claim 1, wherein the approximate value |' for the magnitude of the vector V equals the maximum value from an x- or y-coordinate of the vector V and of the auxiliary vectors $V_i$.

3. The method according to claim 2, wherein the vector is given in a Cartesian coordinate system, further comprising forming n auxiliary vectors $V_i$, and rotating said n auxiliary vectors $V_i$ relative to the vector V by the angle $$\alpha_i = \frac{90^\circ}{2n+1} \cdot 2i$$

where i equals a random whole number between 1 and n.

4. The method according to claim 1, wherein the vector is given in a Cartesian coordinate system, further comprising forming n auxiliary vectors $V_i$, and rotating said n auxiliary vector $V_i$ relative to the vector V by the angle $$\alpha_i = \frac{90^\circ}{2n} + (i-1) \cdot \frac{90^\circ}{n},$$

where i equals a random whole number between 1 and n, so the approximate value $|'$ for the magnitude of the vector V equals the maximum value from the x- and y-coordinates of the auxiliary vectors.

5. The method according to one of claims 1 to 4, comprising transforming vectors V lying in any desired quadrants of the coordinate system into one quadrant by absolute value transformation of the two coordinates.

6. In a method of determining an approximate value for the magnitude of a vector V wherein coordinates of the vectors V are not in a Cartesian coordinate system, comprising transforming the coordinates into Cartesian coordinates by coordinate transformation before the absolute value formation; forming at least one auxiliary vector $V_i$ which has the length of the vector V; and rotating the auxiliary vector $V_i$ relative to the vector V by an angle $\alpha_i$ which is smaller than the angle between the two Cartesian coordinate system axes, so the approximate value $|'$ for the magnitude of the vector V equals the maximum value from the Cartesian coordinates of the vector V and of the auxiliary vector $V_i$.

7. In a circuit arrangement for determining an approximate value for the magnitude of the vector V given by its x- and y-coordinates in a coordinate system and which lies in a quadrant of the coordinate system, wherein as least one auxiliary vector $V_i$ is formed which has the length of the vector V and is rotated relative to the vector V by an angle $\alpha_i$ which is smaller than the angle between the two coordinate axes, and the approximate value $|'$ for the magnitude of the vector V equals the maximum value from the x-and y-coordinates of the vector V and of the auxiliary vector $V_i$, the improvement wherein for each auxiliary vector $V_i$ two proportional stages are provided, to which one of the coordinates of the vector V is supplied on the input side, the proporational stages are connected with the inputs of an adding stage corresponding to each auxiliary vector $V_i$ and the output of each adding stage, and if applicable, a coordinate of the vector V is connected with one input each of a maximum value selection circuit, at the output of which the desired approximate value is available.

8. The circuit arrangement according to claim 7, wherein the maximum value selection circuit comprises n diodes, whose one terminal is connected with an adding stage and whose second terminal is connected with the output of the maximum value selection circuit.

9. The circuit arrangement according to claim 7 or 8, further comprising an operational amplifier provided for each auxiliary vector as proportional and adding stage, said amplifier having a first input connected to the reference potential of the circuit arrangement and to whose second input the x-coordinate is supplied via a first resistance, while the y-coordinate is supplied via a second resistance, that between the second input and the output of a first diode is arranged, that a second diode is connected to the output of the operational amplifier, that the terminal of the second diode away from the operational amplifier is connected via a third resistance with the second input of the operational amplifier, and that this terminal of the second diode of all circuits corresponding to the individual auxiliary vectors $V_i$ is connected for maximum value selection with a common point at which the desired approximate value is available.

10. The circuit arrangement according to claim 7, wherein the maximum value selection circuit comprises n+1 diodes, whose one terminal is connected with an adding stage and whose second terminal is connected with the output of the maximum value selection circuit.

11. The circuit arrangement according to claim 7, wherein the maximum value selection circuit comprises n diodes, whose one terminal is connected with a coordinate of the vector V and whose second terminal is connected with the output of the maximum value selection circuit.

12. The circuit arrnagement according to claim 7, wherein the maximum value selection circuit comprises n+1 diodes, whose one terminal is connected with a coordinate of the vector V and whose second terminal is connected with the output of the maximum value selection circuit.

13. A method for developing a magnitude signal to represent the approximate magnitude of a control parameter vector for the control of a multi-phase electrical apparatus, comprising the steps of:

measuring physical operating characteristics of the apparatus; deriving coordinate signals from the measured characteristics to represent the Cartesian coordinates of the control parameter vector; forming an auxiliary vector coordinate signal from the derived coordinate signals to represent one of the Cartesian coordinates of an auxiliary vector that has the same magnitude as the control parameter vector but is rotated by an angle relative thereto; and selecting as the magnitude signal the auxiliary vector coordinate signal and at least one of the control parameter vector coordinate signals having the greatest absolute value.

14. A method as defined in claim 13, wherein:

the forming step comprises forming a plurality of auxiliary vector coordinate signals from the derived coordinate signals to represent respectively a corresponding one of the Cartesian coordinates of an auxiliary vector belonging to a plurality of auxiliary vectors, each of which have the same magnitude as the control parameter vector but is rotated by a different angle relative thereto; and the selecting step comprises selecting as the magnitude signal the auxiliary vector coordinate signal and at least one of the control parameter vector coordinate signals having the greatest absolute value.

15. A method for developing a magnitude signal to represent the approxmiate magnitude of a control parameter vector for the control of a multi-phase electrical apparatus, comprising the steps of:

measuring physical operating characteristics of the apparatus; deriving coordinate signals from the measured characteristics to represent the Cartesian coordinates of the control parameter vector; forming a plurality of auxiliary vector coordinate signals from the derived coordinate signals to represent respective a corresponding one of the Cartesian coordinates of an auxiliary vector belonging to a plurality of auxiliary vectors, each of which has the same magnitude of the control parameter vector but is rotated by a different angle relative thereto; and selecting as the magnitude signal the auxiliary vector coordinate signal having the greatest absolute value.

16. A method as defined in claims 14 or 15, wherein, in the forming step, the plurality of auxiliary vector coordinate signals represent coordinates of a plurality of n auxiliary vectors which are rotated relative to the control parameter vector, respectively. by angles $\alpha_1, \ldots, \alpha_n$ defined by $$\alpha_i = \frac{90^\circ}{2n+1} \cdot 2i.$$

17. A method as defined in claim 14 or 15, wherein in the forming step, the plurality of auxiliary vector coordinate signals represent coordinates of a plurality of n auxiliary vectors which are rotated relative to the control parameter, respectively, by angles $\alpha_1, \ldots, \alpha_n$ defined by $$\alpha_i = \frac{90^\circ}{2n} + (i-1) \cdot \frac{90^\circ}{n}.$$

18. Circuitry for developing a magnitude signal to represent the approximate magnitude of a control parameter vector for the control of a multi-phase electrical apparatus, comprising:

means for measuring physical operating characteristics of the apparatus;

means for deriving coordinate signals from the measured characteristics to represent the Cartesian coordinates of the control parameter vector;

means for forming an auxiliary vector coordinate signal from the derived coordinate signals to represent one of the Cartesian coordinates of an auxiliary vector that has the same magnitude as the control parameter vector but is rotated by an angle relative thereto; and means for selecting as the magnitude signal the auxiliary vector coordinate signal and at least one of the control parameter vector coordinate signals having the greatest absolute value.

19. Circuitry as defined in claim 18, wherein:

the forming means comprises for forming a plurality of auxiliary vector coordinate signals from the derived coordinate signals to represent respectively a corresponding one of the Cartesian coordinates of an auxiliary vector belonging to a plurality of auxiliary vectors, each of which have the same magnitude as the control parameter vector but is rotated by a different angle relative thereto; and the selecting means comprises means for selecting as the magnitude signal the auxiliary vector coordinate signals and at least one of the control parameter vector coordinate signals having the greatest absolute value.

20. Circuitry for developing a magnitude signal to represent the approximate magnitude of a control parameter vector for the control of a multi-phase electrical apparatus, comprising:

means for measuring physical operating characteristics of the apparatus;

means for deriving coordinate signals from the measured characteristics to represent the Cartesian coordinates of the control parameter vector;

means for forming a plurality of auxiliary vector coordinate signals from the derived coordinate signals to represent respectively a corresponding one of the Cartesian coordinates of an auxiliary vector belonging to a plurality of auxiliary vectors, each of which has the same magnitude as the control parameter vector but is rotated by a different angle relative thereto; and means for selecting as the magnitude signal the auxiliary vector coordinate signals having the greatest absolute value.

21. Circuitry as defined in claims 19 or 20, wherein the plurality of auxiliary vector coordinate signals formed by the forming means represent coordinates of a plurality of n auxiliary vectors which are rotated relative to the control parameter vector, respectively, by angles $\alpha_1, \ldots, \alpha_n$ defined by $$\alpha_i = \frac{90^\circ}{2n+1} \cdot 2i.$$

22. Circuitry as defined in claims 19 or 20, wherein the plurality of auxiliary vector coordinate signals formed by the forming means represent coordinates of a plurality of n auxiliary vectors which are rotated relative to the control parameter, respectively, by angles $\alpha_1, \ldots, \alpha_n$ defined by $$\alpha_i = \frac{90^\circ}{2n} + (i-1) \cdot \frac{90^\circ}{n}.$$

23. Circuitry as defined in claims 18, 19 or 20, wherein means for forming and auxiliary vector coordinate signal comprises for each auxiliary vector coordinate signal a first proportional stage connected to receive and form a part of one of the control parameter vector Cartesian coordinate signals, a second proportional stage connected to receive and form a part of the other of the control parameter vector Cartesian coordinate signals, and an adder stage connected to combine the outputs of the first and second proportional stages.

24. Circuitry as defined in claim 23, wherein the signal selecting means comprises a common terminal; and, for each of the signals from among which the selection is made, a diode with its input connected to receive the signal and its output connected to the common terminal.

25. Circuitry as defined in claims 18, 19 or 20, wherein means for forming auxiliary vector coordinate signal comprises for each auxiliary vector coordinate signal first and second resistors; an operational amplifier having a first input terminal connected to receive a circuitry reference potential, a second input terminal connected to receive one of the control parameter vector Cartesian coordinate signals via the first resistor, and connected to receive the other of the control parameter vector Cartesian coordinate signals via the second resistor, and an output terminal; and a first diode connected between the second input terminal and the output terminal; and wherein the signal selecting means comprises a common terminal; and, for each of the signals from among which the selection is made, a second diode with its input connected to receive the signal and its output connected to the common terminal.

* * * * *